(12) United States Patent
Walther et al.

(10) Patent No.: US 10,384,422 B2
(45) Date of Patent: Aug. 20, 2019

(54) DEVICE, IN PARTICULAR FOR A DISPLAY UNIT

(75) Inventors: Marten Walther, Alfeld (DE); Stephan Reimann, Grünenplan (DE)

(73) Assignee: Schott AG, Mainz (DE)

( * ) Notice: Subject to any disclaimer, the term of this patent is extended or adjusted under 35 U.S.C. 154(b) by 1326 days.

(21) Appl. No.: 13/455,809

(22) Filed: Apr. 25, 2012

(65) Prior Publication Data

US 2012/0268695 A1    Oct. 25, 2012

Related U.S. Application Data

(63) Continuation of application No. PCT/EP2010/006236, filed on Oct. 12, 2010.

(51) Int. Cl.
   *B32B 17/10*    (2006.01)
   *G02F 1/1335*   (2006.01)

(52) U.S. Cl.
   CPC .. *B32B 17/10036* (2013.01); *B32B 17/10174* (2013.01); *G02F 1/133502* (2013.01); *G02F 2203/11* (2013.01)

(58) Field of Classification Search
   CPC ......... B32B 17/10036; B32B 17/10174; G02F 1/133502; G02F 2203/11
   See application file for complete search history.

(56) References Cited

U.S. PATENT DOCUMENTS

| 4,985,312 A | 1/1991 | Furuya et al. |
| 5,073,451 A | 12/1991 | Iida et al. |
| 5,754,262 A | 5/1998 | Lengyel |
| 6,211,934 B1 * | 4/2001 | Habing ............. G02F 1/133509 349/104 |
| 6,391,400 B1 | 5/2002 | Russell et al. |
| 6,570,710 B1 | 5/2003 | Nilsen et al. |
| 6,924,037 B1 | 8/2005 | Joret et al. |
| 7,034,326 B2 | 4/2006 | Noguchi et al. |
| 2002/0167629 A1 * | 11/2002 | Blanchard ............ G02B 5/0278 349/112 |
| 2002/0171788 A1 * | 11/2002 | Lin ........................ B32B 17/10 349/96 |

(Continued)

FOREIGN PATENT DOCUMENTS

| DE | 1 596 810 A1 | 4/1971 |
| DE | 195 03 510 A1 | 8/1996 |

(Continued)

OTHER PUBLICATIONS

Hans-Joachim Glaser "Dunnfilmtechnologie auf Flachglas", Publisher Karl Hoffmann, 1999, pp. 155-200 and 219-228 (56 pages).

(Continued)

*Primary Examiner* — Nathanael R Briggs
(74) *Attorney, Agent, or Firm* — Taylor IP, P.C.

(57) ABSTRACT

A device, in particular for display units, includes a first transparent panel element and a second transparent panel element and a coating introduced between the first transparent panel element and the second transparent panel element. The coating is an IR-reflective coating which is applied onto the first and/or second element. The at least first transparent panel element and the at least second transparent panel element and the coating form a lamination. The space between the panels is filled with a filler material.

42 Claims, 13 Drawing Sheets

EMBODIMENTS OF THE GLASS PANEL ELEMENT OF THE PRESENT INVENTION WITH INTEGRATED POLARIZING FILTER

(56) References Cited

U.S. PATENT DOCUMENTS

| | | | | |
|---|---|---|---|---|
| 2003/0186064 | A1* | 10/2003 | Murata | B32B 17/10174 |
| | | | | 428/432 |
| 2003/0228484 | A1* | 12/2003 | Finley | B32B 17/00 |
| | | | | 428/577 |
| 2004/0009356 | A1* | 1/2004 | Medwick | C03C 17/36 |
| | | | | 428/432 |
| 2008/0206533 | A1 | 8/2008 | Yaoita et al. | |
| 2009/0096972 | A1* | 4/2009 | Kameshima | G02F 1/133502 |
| | | | | 349/137 |
| 2009/0135319 | A1* | 5/2009 | Veerasamy | G02F 1/1334 |
| | | | | 349/16 |
| 2009/0135365 | A1* | 5/2009 | Dunn | H05K 7/20972 |
| | | | | 349/161 |
| 2009/0237782 | A1 | 9/2009 | Takamatsu et al. | |
| 2009/0316271 | A1* | 12/2009 | Shibayama | G02B 1/111 |
| | | | | 359/601 |
| 2010/0085503 | A1* | 4/2010 | Kim | G02B 6/0091 |
| | | | | 349/58 |
| 2012/0164458 | A1* | 6/2012 | Biteau | G02B 1/105 |
| | | | | 428/447 |
| 2012/0176681 | A1* | 7/2012 | Chang | C23C 18/1225 |
| | | | | 359/614 |

FOREIGN PATENT DOCUMENTS

| | | |
|---|---|---|
| DE | 28 24 195 A1 | 12/1997 |
| DE | 196 44 004 A1 | 5/1998 |
| DE | 199 27 683 C1 | 1/2001 |
| DE | 694 30 986 T2 | 2/2003 |
| EP | 1 873 001 A1 | 1/2008 |
| EP | 2 063 312 A1 | 5/2009 |
| JP | 61-185081 A | 8/1986 |
| JP | 11-34216 A | 2/1999 |
| JP | 20011264509 A | 9/2001 |
| JP | 2006-162890 A | 6/2006 |
| WO | 87/07394 | 12/1987 |

OTHER PUBLICATIONS

International Search Report dated Apr. 15, 2011 for International Application No. PCT/EP2010/006236 (12 pages).

International Preliminary Report on Patentability and Written Opinion of the International Searching Authority dated May 8, 2012 for International Application No. PCT/EP2010/006236 (21 pages.).

German Office Action dated Jun. 16, 2010 for German Application No. 10 2009 051 116.4-51 (5 pages).

Translation of Japanese Office Action dated Dec. 17, 2013 for Japanese Patent Application No. 2012-535654 (7 pages).

European Search Report dated Mar. 21, 2014 for European Patent Application No. 14 00 0501 (9 pages).

* cited by examiner

FIG. 1A
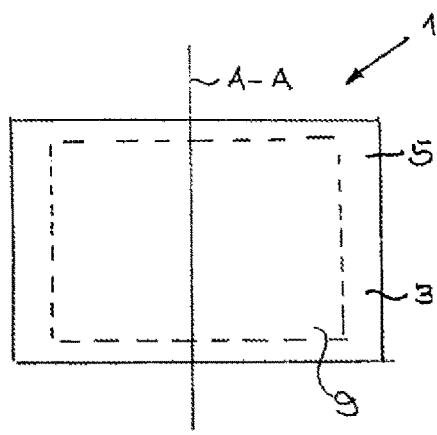
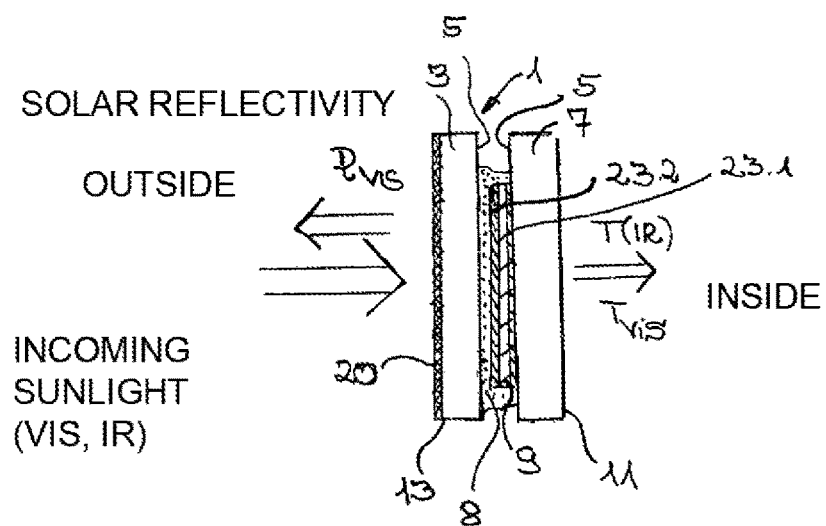
FIG. 1B

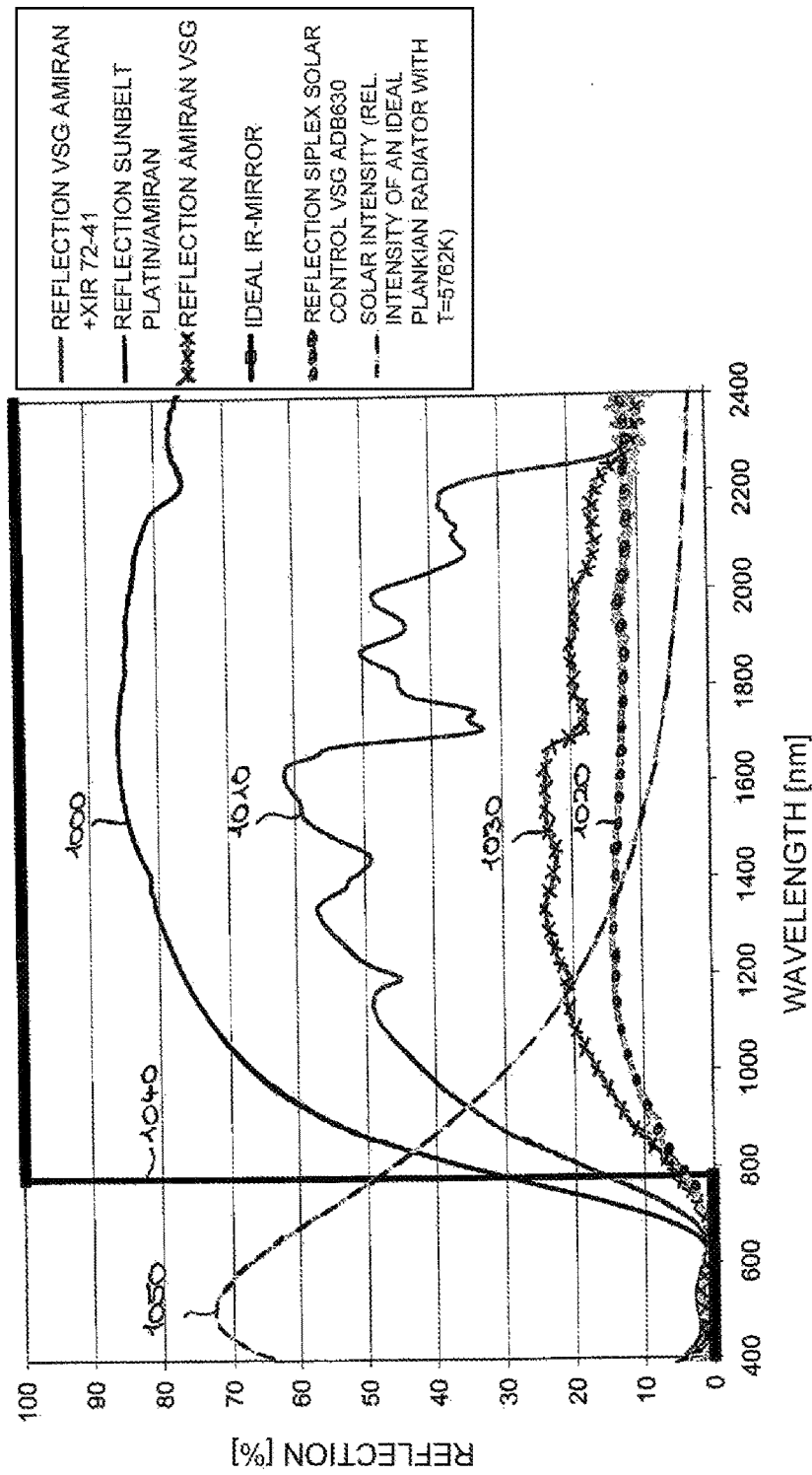

FIGS. 4A-D EMBODIMENTS OF THE GLASS PANEL ELEMENT OF THE PRESENT INVENTION WITH INTEGRATED POLARIZING FILTER

FIGS. 4A-D EMBODIMENTS OF THE GLASS PANEL ELEMENT OF THE PRESENT INVENTION WITH INTEGRATED POLARIZING FILTER

FIGS. 4A-D EMBODIMENTS OF THE GLASS PANEL ELEMENT OF THE PRESENT INVENTION WITH INTEGRATED POLARIZING FILTER

FIGS. 4A-D EMBODIMENTS OF THE GLASS PANEL ELEMENT OF THE PRESENT INVENTION WITH INTEGRATED POLARIZING FILTER

FIGS. 5A-B EMBODIMENTS OF THE GLASS PANEL ELEMENT ACCORDING TO THE PRESENT INVENTION WITH INTEGRATED POLARIZING FILTER AND ADDITIONAL IR-PROTECTIVE DEVICE

FIGS. 5A-B EMBODIMENTS OF THE GLASS PANEL ELEMENT ACCORDING TO THE PRESENT INVENTION WITH INTEGRATED POLARIZING FILTER AND ADDITIONAL IR-PROTECTIVE DEVICE

DEVICE, IN PARTICULAR FOR A DISPLAY UNIT

CROSS REFERENCE TO RELATED APPLICATIONS

This is a continuation of PCT application No. PCT/EP2010/006236, entitled "DEVICE, IN PARTICULAR FOR A DISPLAY UNIT", filed Oct. 12, 2010, which is incorporated herein by reference.

BACKGROUND OF THE INVENTION

1. Field of the Invention

The current invention relates to a device, in particular for a display unit.

2. Description of the Related Art

In particular with display units which find preferred application outdoors the problem arises that the display units must be cooled with the assistance of expensive cooling units in order to prevent unacceptable heating of same. This is problematic in particular if the display units are subjected outdoors to high solar irradiance. Display units may for example include displays. The displays may themselves be equipped with polarizers or may emit polarized light.

In order to prevent heating through solar irradiance, an infrared (IR)-radiation reflecting SIPLEX-solar control film which is produced as a laminated glass by Haller (Kirchlengern) is applied onto the glass, in particular onto the panel, preferably onto the front panel of the display unit. However, with a solution of this type there is still a transmission in the IR-range, in other words in the wave length range of 780 to 2000 nanometers (nm) of 28% which results in that heating through incident light radiation, in particular through solar irradiance, of a display unit which is equipped with and disposed behind such a glass panel that cannot be sufficiently avoided. For heating through solar radiation, radiation having wave lengths in the range of 700 nm to approx. 1200 nm is particularly relevant, since the solar spectrum in this wave length spectrum still possesses appreciable energy. Furthermore, a high share of radiation is absorbed by the SIPLEX-Solar-Control-Film, so that the front panel heats up considerably and transfers the heat, for example to the display positioned behind it.

Additional films which reduce heat input through external solar irradiance are, for example laminates, which include an XIR film by Southwall, Palo Alto, Calif., USA (Internet: www.southwall.com). With this film a higher share of the undesirable solar irradiance is reflected in the IR-spectral range, so that a small reduction of the radiation onto the display arranged behind it, or respectively onto the display unit, can be recognized. However, this XIR film is highly absorbent so that the front glass is heated more strongly than it would be when using the Siplex solar-control film. Moreover the XIR film is encapsulated through lamination which leads to strong optical inhomogeneity so that a practical application in the field of display glasses is not possible.

One disadvantage of the aforementioned films is that low transmission is gained with high absorption. The result is that the front panel, for example a display unit, heats up and due to the heat radiation, heat is introduced into the entire system, in this case the display unit.

An additional disadvantage of the aforementioned solutions was that the influence is restricted to the infrared spectral range, in other words to within the wave length range of 780 to 2500 nm. Especially in the visible range of 380 nm to 780 nm, however, a considerable part of the solar irradiance is effective and leads in addition to the infrared range to considerable temperature increases of the display behind a front panel of a display unit. Especially in areas of high solar irradiance this results in that heating up through incident light radiation, in particular through solar irradiance, of a display unit which is equipped with and disposed behind such a glass panel cannot be sufficiently avoided and that the display is heated to above its maximum permissible operating temperature. This causes the display to become black and it is therefore no longer legible. For heating through solar irradiance the entire spectrum with wave lengths in the range of 300 nm to approximately 2500 nm is relevant. The known solutions for reduction of solar irradiance generally only target the infrared range of 780-2500 nm in which the human eye is not sensitive and leave the visible spectral range essentially unaffected, even though solar spectrum in this wave length range still possesses appreciable energy.

Passive methods to reduce the energy being introduced into the visible wave length range are coatings which reflect a high share of the visible light, thereby reducing the incoming energy. An example for this is the product MIRONA by SCHOTT AG, which has a reflection of approximately 35% in the visible range. The disadvantage of this solution is that the contrast of the display unit disposed behind it is substantially reduced by this reflectivity. The relation of the desired radiation from the display unit to the viewer in regard to the radiation which is reflected from the surrounding area on the front side of the front panel of the display unit becomes increasingly poorer with increased ambient brightness and often leads to complete illegibility of the display unit at bright daylight. As a solution for improvement of this contrast, glass panels which are coated with anti-reflective coatings are often used in these situations which however, offer no effective solar protection in the visible range. An additional disadvantage of the films, in particular when used in a display unit was that they displayed poor optical characteristics.

A laminated glass panel having an IR-reflective layer has become known from US 2009/0237782 A1, especially for large area glass. Further, DE-A-15 96 810 shows large glass panels with a metal coating, in particular a gold or copper coating which reflects infrared radiation and long-wave light. A solar- and heat-ray reflecting laminated glass panel has also become known from DE-C-199 27 683. In addition, DE-A-195 03 510 provides a method for producing an IR-reflective laminated glass panel. Further, DE-T-694 30 986 provides a light valve as an electrode with a coating having low emission properties. Display units have also become known from DE-A-28 24 195 or JP-A-2006-162890.

What is needed in the art is a device which avoids the disadvantages of the current state of the art.

SUMMARY OF THE INVENTION

According to a first aspect of the present invention there is provided a device for a display unit, including at least one first transparent panel element and a second transparent panel element, and a coating introduced between the first transparent panel element and the second transparent panel element. According to a second aspect of the present invention, there is provided a device for a display unit, including a first transparent panel element and a polarizing filter.

More specifically, the present invention provides according to the first aspect of the invention, a system including of at least one first transparent panel element and a second transparent panel element. The first and second transparent elements may be formed of glass or polymer material and may be discoidal in shape. An IR-reflective coating is introduced between the first transparent panel element and the second transparent panel element in such a manner that the first and the second transparent panel element form a lamination, whereby the space between the panels is filled with a solid or liquid filler material. Accordingly the filler material is not gaseous as in the case of insulating glass laminations.

A lamination of this type makes possible IR-reflective coatings, for example based on transparent metals, such as silver coatings, so-called low-E coatings (low emissivity coatings) which have a very high reflectivity in the range of IR-radiation of between approximately 780 nm to 2000 nm.

Since the IR-reflective coating is introduced between the first and the second transparent panel element and is protected by same it is possible to use highly efficient silver single or multi-layer coating as IR-reflective coating, which is highly susceptible to corrosion, and to protect against chemical and mechanical degradation, especially oxidation.

Such highly reflective IR-coatings based on silver coatings are known as so-called "soft coatings" and are for example described in detail in "Hans-Joachim Gläser, Dünnfilmtechnologie auf Flachglas", page 167-171. The disclosure content of this documentation is incorporated in its entirety into the current application. In order to minimize corrosion susceptibility of the coating introduced between the first transparent panel element and the second transparent panel element, the edge of the first transparent panel element and/or of the second transparent panel element may have no IR-reflective coating, for example when the IR-reflective coating has a very high reflectivity in the wave length range of between approximately 780 nm to 2500 nm. In an ideal situation the reflectivity would be 100% for wave lengths in the range of between 780 nm to 2500 nm.

If one approximates the radiation emitted from the sun, in other words the spectrum of solar light through a Planckian radiator with a temperature $T_{STRAHLER}$=5762 K, then one can derive that—when neglecting the UV content—with wave lengths of <350 nm approximately 55% of the energy or respectively the intensity of the sun light is in the visible wave length range of between 350 nm to 780 nm and approximately 45% of the energy in the IR-wave length range of between 780 nm to 2500 nm. An ideal IR-mirror having a reflectivity of 100% in the wavelength range of 780 nm to 2500 nm would therefore reflect 45% of the sunlight, namely the IR-content.

In order to cite the quality of the reflectivity of the coating for IR-radiation the IR-solar reflectivity is defined in the current application. In this application the spectral reflectivity of the IR-coating in the wavelength range of between approximately 780 nm to 2500 nm is defined as IR-solar reflectivity, folded with the relative intensity of the approximated spectrum of sunlight for a Planckian radiator with a temperature of 5762 K. Whereas the so defined IR-solar reflectivity for foils according to the current state of the art, for example XIR foils in laminates is approximately at 40%, the inventive systems distinguish themselves with an inventive IR-coating through an IR-solar reflectivity in the range of between approximately 45% to 95%, for example between approximately 50% to 80%.

Polymer materials, hardened inorganic materials, for example cast resin or film, for example polychlorinated biphenyl (PCB)-films, polyvinyl butyral (PVB)-films, ethyl vinyl acetate (EVA) films are, for example, used as solid or respectively liquid filler material which is introduced between the two transparent panels.

The aforementioned foils may, in addition to the inventive IR-radiation-reflective coating, also include additional coatings, for example additional low-E-coatings which are applied onto the film. The coating highly reflecting the IR-radiation can either be applied onto one or onto both transparent panel elements or onto the film which is laminated between the transparent panels.

To produce a lamination, for example using a polymer material, a PCB-film, a PVB-film or an EVA-film, the polymer material or respectively the film is liquefied or softened through pressure and adhered together with the first transparent panel element and the second transparent panel element, resulting in the lamination. Hereby, the highly reflective IR-coating may be directly adhered together.

In regard to corrosion resistance, the edge of the first transparent panel element and the second transparent panel element may include a sealing material. One possible sealing material which may be used for this is for example butyl rubber which distinguishes itself through low gas permeability. An alternative sealing option is sealing with a continuous aluminum foil which again is adhered together with a synthetic material having low gas permeability.

In addition to the previously mentioned low-E-coating based on silver coatings, as described for example in Hans-Joachim Gläser "Dünnfilmtechnologie auf Flachglas", Publisher Karl Hoffmann, 1999, pages 155-200 and 219-228, other layers/coatings with very good conductibility can also be used. Examples for this would be gold or aluminum coatings.

The edge of the first and/or second transparent panel element should be configured so that the applied low-E-layers do not corrode from the side of the lamination. Removal of coating from the edge, may for example, be employed effectively, whereby the low-E-layer does not extend to the edge and whereby the laminate therefore can be sealed on the edge directly between top and bottom glass. For example, at least 5 millimeters (mm) of the transparent panel are configured as edge where the IR-reflective coating is interrupted or respectively has no IR-reflective coating. The maximum limit of the edge is selected so that the visible area for the viewer of the laminated glass panel is not impaired.

In order to increase the contrast and thereby the display quality, for example when using in the information display field, that is for display units, it is provided that the first and/or the second transparent panel element is equipped with anti-reflective- or anti-reflection coating. By equipping the device with at least one anti-reflective coating or respectively anti-reflection coating, the reflection, for example in the visible wave length range of 380 nm to 800 nm, of a transparent panel element is clearly reduced so that the contrast compared to devices without anti-reflective coating is clearly increased. The reflectance $R_{vis}$ is for example reduced by the anti-reflective coating by between approximately 10% to 4% compared to a transparent panel element which is not provided with anti-reflective coating. If the reflectance $R_{vis}$ of the transparent panel element is for example approximately 8% without anti-reflective coating, then the reflectance $R_{vis}$ can be reduced to between approximately 0.1% to 6%, for example to between approximately 0.2% to 4% by the anti-reflective coating. The aforementioned reflectance $R_{vis}$ refers to a reflectance at standard light D65 (artificial daylight), folded with eye sensitivity. Even though the reflection for individual wavelengths can be greater than for example 2%, a value $R_{vis}$ of 1% or less may result for standard light D65.

In order to achieve a high IR-reflection and, for example a IR-solar reflectivity in a range of between approximately 45% to 95%, for example between approximately 5% to 80% for the entire system consisting of the two transparent panel elements and the solid or liquid filler materials introduced between them, the low-E coating system based on at least one silver layer is adjusted to achieve high IR-reflection. For this purpose the layers surrounding the silver are adapted so that the anti-reflective effect is adapted to the refractive index of the solid or liquid filler material, for example the laminating film, such as the PVB-film. Such refractive index adaptation may for example be achieved through cathode sputtering. Cathode sputtering has for example a plurality of oxidic materials with the assistance of which an adaptation of this type may be implemented. As a basis for the low-E coatings solar protective layers "Sunbelt Platin" produced by ARCON (Bucha, Feuchtwangen) can for example be used which is modified according to the above standards, in other words which is adapted to the refractive index of the solid or liquid filler material, for example films.

It is possible in particular through introduction of adaptation layers which include, for example, oxidic or oxidic conductible layers that the reflectivity $R_{vis}$ of the unit is <approximately 2%, for example, <approximately 1%.

By reducing the reflection on the surface of the lamination due to the anti-reflection or respectively anti-reflective coating, as well as inside the lamination due to the low-E-layer and possibly adaptation layers, the contrast compared to an element not equipped with an anti-reflective coating is substantially increased. The anti-reflective coatings are, for example, interference coating systems. In such systems light is reflected at the interface border areas of the anti-reflective coating. The waves reflected at the interface border areas may even be eliminated completely due to interference, if phase-conditions as well as amplitude conditions are met.

Such anti-reflective coatings are realized for example in the products AMIRAN, CONTURAN or MIROGARD by Schott AG. In regard to an interference coating system for broadband anti-reflection we also refer to EP-A-1248958, the disclosure content of which is incorporated into the current application in its entirety.

In addition to reducing reflection $R_{vis}$ in the optical visible spectral range between approximately 380 nm to 780 nm, an increase in the transmission of, for example, up to approximately 10% may be achieved through the anti-reflective coating.

The anti-reflective coating may be applied on one side of the first and/or the second transparent panel element facing outward, in other words facing the atmosphere. Layers which are produced according to varying methods can be considered for use as anti-reflective coatings. Such layers may be produced according to a sol-gel method, sputtering, an etching process or a chemical vapor deposition (CVD)-process. Specifically, the anti-reflective coating can be applied in one of the following application methods:

a) The anti-reflective coating is applied with the assistance of liquid technology, whereby the coating applied with the assistance of the liquid technology is provided with the assistance of one of the following techniques:
   The anti-reflective coating is applied with the assistance of the sol-gel technology;
   The anti-reflective coating is produced as single-layer interference coating in the sol-gel-technology;
   The anti-reflective coating is produced as multi-layer interference coating in the sol-gel technology;
   The anti-reflective coating is produced as a three-layer interference coating in the sol-gel technology, whereby the first layer has a refractive index between approximately 1.6 and 1.8, the second layer has a refractive index between approximately 1.9 and 2.5 and the third layer has a refractive index between approximately 1.4 and 1.55.

b) The anti-reflective coating is produced with the assistance of a high-vacuum technology, whereby the coating applied with the assistance of high-vacuum technology is provided in one of the following techniques:
   The anti-reflective coating is produced with the assistance of a high-vacuum technology as a single layer system;
   The anti-reflective coating is produced in a sputtering process under high vacuum;
   The anti-reflective coating is produced in a high-vacuum coating process by thermal evaporation;

c) The anti-reflective coating is produced with the assistance of a CVD process, whereby the layer applied with the assistance of a CVD process is provided in one of the following techniques:
   The anti-reflective coating is produced in an online-CVD process; or
   The anti-reflective coating is produced in an offline-CVD process;

d) The anti-reflective coating is produced with the assistance of an etching process, whereby the layer applied with the assistance of an etching process is provided in one of the following techniques:
   The anti-reflective coating is produced with the assistance of an etching process as a porous layer;
   The anti-reflective coating is produced with the assistance of an etching process as a light-scattering surface.

Fields of application for the present invention, which distinguishes itself in particular in that it offers high IR-reflectivity for one, are in the area of display units, for example outdoor information display units, such as LCDs. When utilizing an anti-reflective coating high contrasts, for example contrasts in the range of between approximately 40 to 80 can be achieved without however being limited to this. In addition to the system, in particular the system for a display unit which includes the first and second transparent panel elements, the present invention also provides a display unit with a display or respectively a display device, and a front panel, whereby the front panel as the inventive device includes two transparent panel elements with IR-reflecting coating between them. As display units, liquid crystal display (LCD) units or also organic light-emitting diode (OLED) units or light-emitting diode (LED) units are considered. In addition to the use in display units, application in picture glazing is also possible.

According to a second aspect of the present invention, a device for an information display element is provided which includes at least one first transparent panel element and at least one polarizing filter. The at least one first transparent panel element may be formed of glass or polymer material and may be discoidal in shape. The polarizing filter is hereby applied in such a way that the emitted polarized light of a display unit is only slightly subdued by the device. According to the present invention this is achieved in that the transmitting direction of the polarizing filter of the device is oriented such that the polarizing filter allows the greatest part of the light emitted from the display unit to pass through. The intelligence signal from the display unit is thereby transmitted through the device to a high portion of greater than approximately 70%, for example greater than approximately 80%, however at the same time the sunlight is dampened, with the plane of polarization orthogonally to the transmitting direction of the polarizer. To provide good legibility of the indication in a display the transmission of the emitted light of the display unit through the device should be higher than approximately 50%, for example higher than approximately 70%.

A space is located between the device and the display unit which is filled with a gaseous medium. The gaseous medium may be air or nitrogen or an inert gas such as helium or argon. The distance between the inventive device and the display unit which represents the space between them is in a range of between approximately 1 to 500 mm, for example between approximately 5 to 100 mm.

This type allows the polarized visible radiation—here defined as the spectral range of between approximately 380 nm to 780 nm wavelength—to travel from the display unit at a high transmission of greater than approximately 70%, for example greater than 80% through the device to the viewer, while a share of only approximately 50% of the non-polarized sunlight in the visible wave length range of the radiation reaches the display unit.

In addition all previously described solutions to reduce the transmission in the infrared portion of the solar radiation, can be utilized in embodiment in the infrared wavelength range between approximately 780 nm to 2500 nm, in order to also suppress this spectral portion. In particular the described measures according to the first aspect of the present invention to reduce the transmission of the infrared share of solar light through the device to the display unit may be utilized.

According to the second aspect of the present invention, polarizing filters are used which are the standard in the display units discussed here. Display units according to the described invention are also referred to as LC-Displays, liquid crystal screens, liquid crystal displays or thin film transistor (TFT) screens, whereby the light is produced with background lighting and a polarizing filter and through a turn in the polarization direction through liquid crystal elements in conjunction with an additional front polarizing filter is transformed into an intensity change. However, all other information display systems which emit polarized light can also be improved by the described embodiment.

In an alternative embodiment of the present invention the display unit can be modified so that the polarizing filter of the device may simultaneously serve as the front filter of the display unit. In this case a space between the device and the display unit, for example the region with the liquid crystals is necessary, in order to reduce heating of the liquid crystals in the display unit.

A polarizing filter or polarizer is a filter which only permits transmission of light or respectively light waves which are aligned in a defined direction. Polarizing filters may also be realized through a number of different technologies. The best known technology works with stretching of films which include layers of polyvinyl alcohol and into which suitable particles such as for example dichroitic colorants, very fine carbon fibers or diffused iodine. Due to the stretching of the film in one direction, the molecules along the stretching direction are aligned parallel. After the alignment the molecules absorb emerging light strongly anisotropic. While non-polarized light which passes through a polarizing filter is almost not absorbed in one oscillation plane, the in particular thereto almost perpendicular orthogonal oscillation plane of the light is absorbed almost completely. It is known to the expert that in application of the device according to the present invention however, all available polarizing filters may be utilized as long as they provide a clear polarization effect in transmission at least in the visible range of the solar radiation. With polarizing filters which moreover also influence the infrared component of the light, the positive effect is again reinforced. Polarizers are offered by many companies. One example is the company ITOS in Mainz who offer polarizing filters and who also offer technical information on the internet in regard to the function of the polarizers.

If one approximates the radiation emitted from the sun, in other words the spectrum of solar light through a Planckian radiator with a temperature $T_{STRAHLER}=5762$ K, then one can derive that—when neglecting the UV content—with wave lengths of <approximately 350 nm approximately 55% of the energy, or respectively the intensity, of the sun light is in the visible wave length range of 350 nm to 780 nm and approximately 45% in the IR-wave length range of 780 nm to 2500 nm. When using the hereby described polarizers half of the radiation from the visible part of the spectrum (approximately 55% of the spectral intensity) can be absorbed by the polarizer (namely substantially the orthogonal radiation for the alignment of the polarizing filter) and no longer contribute to the heating of the display unit. This share therefore which can be voided amounts to approximately 27% of the energy, meaning half of the above mentioned spectral intensity of 55%.

The described polarizing filters are produced in great numbers for the display industry. The polarizing filter is thereby normally equipped with a self-adhesive layer in order to be able to be mounted directly to the front panel of the display unit. The front side of the polarizer may optionally also be provided with an anti-reflective layer which minimizes disruptive reflections on the front side and which contributes to increasing the contrast in bright surroundings.

The device according to the second aspect of the present invention can be realized in different ways as front panel and protective screen for a display. In the simplest form, the polarizing filter described above is attached to a first transparent panel element, for example to a rigid glass panel and in this manner forms a simple lamination. If such a lamination is to be used as a front panel or protective screen for a display unit, then the polarizing filter described above is attached to a first transparent panel element so that the polarizing direction for high transmission is parallel to the polarizing direction of the front polarizer in the information display element.

The polarizing filter described above can however also be laminated between a first transparent panel element and a second transparent panel element so that a solid lamination results which provides increased mechanical strength and which may for example be admitted as laminated safety glass.

As solid or respectively liquid filler material which is introduced between the two transparent panel elements polymer materials, hardened inorganic materials, for example cast resin or film, for example PVB (polyvinyl butyral) films, EVA (ethylene vinyl acetate) films, PA (polyacrylate) films, PMMA (polymethyl-methacrylate) films or PUR (polyurethane) films may be used.

In addition to the inventive introduction of a polarizing filter, with the two previously described polymer materials, IR-radiation reflecting coatings or IR reflecting films can be introduced into the lamination, for example additional low E-layers applied to film as described according to the first aspect of the present invention. The protective effect in the infrared range can thereby additionally be improved. Low-E coatings are an example for IR-reflecting coatings, for example based on transparent metal coatings, such as silver coatings which possess a very high reflectivity in the range of the IR-radiation of between 780 nm to 2500 nm.

To produce the lamination, for example using a polymer material such as a PVB film, EVA film, PA film, PMMA film or PUR film, the polymer material or respectively the film is liquefied or softened through pressure and adhered together with the first transparent panel element and the second transparent panel element, resulting in the lamination.

In order to increase the contrast and thereby the display quality for a display unit, for example if the device is used in the information display field, an additional embodiment of the present invention provides that the first and/or last surface of the lamination is coated with an anti-reflective or anti-reflection coating.

By coating the at least one surface of the lamination with an anti-reflective coating or respectively anti-reflection coating, the reflection, for example in the visible wavelength range of 350 nm to 780 nm of a device, is clearly reduced and thereby the contrast compared to devices without anti-reflective coating is clearly increased. This contrast relates to the relationship of the light emitted from the display relative to the radiation of ambient light reflected from the front panel. The reflectance $R_{vis}$ is reduced through the anti-reflective coating by a factor of, for example, between approximately 4 to 50 compared to a panel element which is not provided with an anti-reflective coating. If the reflectance $R_{vis}$ of the panel element without anti-reflective coating is for example approximately 8%, then the reflectance $R_{vis}$ may be reduced to between approximately 0.1% to 6%, for example to between 0.2% to 4% through the anti-reflective coating. The aforementioned reflectance $R_{vis}$ refers to a reflectance at standard light D65 (artificial daylight), folded with eye sensitivity. Even though the reflection for individual wavelengths can be greater than for example 2%, a value $R_{vis}$ of 1% or less may result for standard light D65.

By reducing the reflection on the surface of the lamination due to the anti-reflection or respectively anti-reflective coating, as well as inside the lamination due to the low-E-layer and possibly adaptation layers, the contrast compared to an element not equipped with an anti-reflective coating is substantially increased. The anti-reflective coatings may, for example, be interference coating systems. In such systems light is reflected at the interface boundary areas of the anti-reflective coating. The waves reflected at the interface border areas may even be eliminated completely due to interference, if phase-conditions as well as amplitude conditions are met.

Such anti-reflective coatings are realized for example in the products AMIRAN, CONTURAN or MIROGARD by Schott AG. In regard to an interference coating system for broadband anti-reflection we also refer to EP-A-1248958, the disclosure content of which is incorporated by reference into the current application in its entirety.

In addition to reducing reflection $R_{vis}$ in the optical visible spectral range 380 nm to 780 nm an increase in the transmission of, for example, up to 10% may be achieved through the anti-reflective coating.

The anti-reflective- or respectively anti-reflection coating—or in short AR-coating—is applied, for example, on one side of the first and/or the second transparent panel element facing outward, in other words facing the atmosphere. Layers which are produced according to varying methods can be considered for use as anti-reflective- or respectively anti-reflection coatings. Such layers may be produced according to a sol-gel method, sputtering, an etching process or a CVD-process. It is also possible to deposit such an AR-coating directly on the polarizing filter. Specifically, the anti-reflective coating can be applied in one of the previously described application methods with liquid technology, high-vacuum technology, a CVD-process or an etching process.

The present invention according to the second aspect distinguishes itself in particular in that when light passes through the device, depending on the arrangement of the polarization direction of the polarizing filter, a plane of polarization of the light in the optical spectral range between approximately 380 nm and 780 compared to the corresponding orthogonal plane of polarization is strongly suppressed. Typically, technical polarizers achieve a suppression of the light in one polarizing direction of more than 1:1000 in the optically visible wavelength range. However, the described positive effect of the solar protective effect can already be reached at suppression levels of better than 1:5 in the optically visible spectral range. The transmission of the light in the optical spectral range of 380 nm to 780 nm through the device is, according to the present invention, in a ratio if the throughput through the device parallel to the orthogonal polarization direction of the polarizing filter, measured with polarized light of at least 3 to 1, for example 5 to 1, or above 10 to 1.

With the utilization of an anti-reflective coating high contrasts, for example contrasts in the range of between approximately 40 to 80 can be achieved, without being limited to these. Such devices according to the present invention can be used in the field of display units, such as in display units for outdoors and may be for liquid crystal display units. The inventive device is hereby arranged as a front- or protective panel at the front of the display unit, whereby a space may be provided between the device and the display unit which is filled by a gaseous medium.

When used outdoors, the device according to the second aspect of the present invention can be configured in an additional embodiment with an edge seal, providing the additional advantage of resistance against high humidity. In regard to the corrosion resistance of a polarizing filter, the edge of the first transparent panel element and the second transparent element in a lamination may include a sealing material. One possible sealing material which can be used for this purpose is for example butyl rubber which distinguishes itself through low gas permeability. An alternative sealing option is a seal provided by a continuous aluminum foil which is also adhered with a synthetic material having low gas permeability.

The edge of the first and/or second transparent panel element should be configured so that the applied polarizing filter and possible also additionally applied low-E-layers do not corrode from the side of the lamination. Removal of the coating from the edge may for example be employed effectively, whereby the low-E-layer and also the polarizing filter do not extend to the edge and whereby the laminate therefore can be sealed on the edge directly between top and bottom glass.

At least approximately 5 mm of the glass panel may be configured as an edge where the polarizing filter and possibly the R-reflective coating is interrupted or respectively has no IR-reflective coating and no polarizing filter. The maximum limit of the edge is selected so that the visible area for the viewer of the laminated glass panel is not impaired.

The present invention also provides a display unit with a display or respectively a display device and a front transparent panel whereby the front transparent panel as the inventive device includes at least one transparent panel element with applied polarizer and whereby a space is arranged between the display or respectively the display device and the front transparent panel. The at least one transparent panel may be formed by glass or polymer material and may be discoidal in shape. As display units, liquid crystal display units are considered and also other display units in which the light emitted from the display is emitted strongly polarized.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIGS. 1a-b illustrate the inventive transparent panel with IR-reflective coating, according to a first aspect of the present invention;

FIGS. 3a-b illustrate the reflection and transmission curves of the inventive IR-coating in dependence upon the wavelength;

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 2:
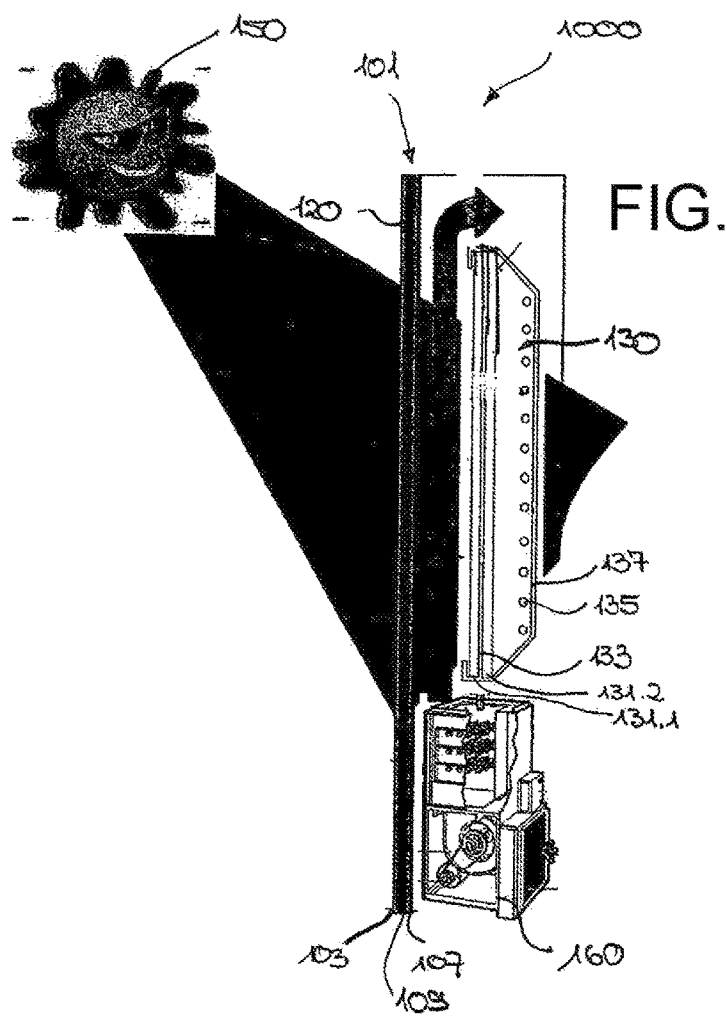
FIG. 2 illustrates a liquid crystal display unit with an inventive transparent panel according to FIGS. 1a-b.

Referring now to the drawings, and more particularly to FIG. 1a, there is shown a top view of inventive device 1. Further, FIG. 1b shows a section along line A-A according to the first aspect of the present invention. The top view according to FIG. 1a shows first transparent panel element 3 according to a first aspect of the present invention. First transparent panel element 3 includes edge 5 which is not provided with IR-reflective coating 9. The construction of the system or respectively device 1 which, according to this example is also referred to as laminated element consisting of two transparent panel elements 3, 7 can be seen more clearly in the sectional view along line A-A according to FIG. 1b. Element 3 identifies again the first transparent panel element. The IR-reflective coating is introduced between first transparent panel element 3 and second transparent panel element 7 and is identified with reference number 9. The IR-reflective coating, together with the two transparent panel elements form a lamination or respectively a laminated panel. In order to form the lamination, solid or liquid filler material 8, such as a polymer material or a solidified inorganic substance is introduced into the space between panels 3 and 7. In contrast to an insulating glass lamination whereby two glass panels are arranged separated from each other through a space with a gaseous medium, panel elements 3, 7 of the inventive device fit directly against each other through filler material 8 and IR-reflective coating 9, resulting in a laminated element. As can be seen from the sectional view according to FIG. 1b, edge 5 of panel element 3, as well as of panel element 7 is not provided with filler material 8 or IR-reflective coating 9. A sealing compound (not illustrated) can be provided in the edge region which prevents moisture penetration into the space between the first transparent panel element and the second transparent panel element due to diffusion along the filler material, for example a foil, thereby protecting IR-reflective coating 9 which is, for example a low-E-coating, and which is disposed between the first and the second transparent panel elements from corrosion. Shown is also transmission $T_{vis}$ or respectively T (IR) and reflection $R_{vis}$ or respectively IR-solar reflectivity of incident sunlight from the exterior surface, including visible light (VIS) and IR-radiation for the laminated transparent element or respectively device 1. In order to achieve a high transmission $T_{vis}$ and a low reflection $R_{vis}$, <approximately 2%, for example <1% in the visible wavelength range, oxidic and/or conductive oxidic adaptation layers 23.1, 23.2 can be provided, which minimize the reflectivity $R_{vis}$ inside device 1 or respectively the laminated transparent element. Layers 23.1 of this type are used already below low-E-layer 9, in order to adapt the silver coating to the surface of second transparent panel element 7. Similar layer composition 23.2 can then also be utilized above low-E-layer 9, so that approximately symmetric layer formations are formed on both sides of low-E-layer 9. These layers are composed of diffusion blocking layers to protect the silver of the low-E-layer, as well as of adaptation layers including other oxides or nitrides, whose refractive index changes and layer thicknesses are then configured as adaptation layer.

The configuration of an IT-reflective coating, for example a low-E-coating on the basis of silver layers is described in detail in "Dünnfilmtechnologie auf Flachglas" (thin film technology on flat glass"), page 167-171 by Hans-Joachim Gläser and the disclosure content of this documentation is incorporated in its entirety into the current application. Whereas also other metals, such as gold or aluminum are possible as IR-reflective coatings, silver has a good color effect.

When using the device, for example outside for display units, in order to increase the contrast in the event of direct solar irradiation, the exterior surface, namely side 13 of the device facing the atmosphere is provided with an anti-reflective coating or respectively anti-reflection coating 20. In the current example only side 13 of the first transparent panel element is provided with anti-reflective- or respectively anti-reflection coating 20. Of course, the interior surface that is side 11 of second transparent panel element 7 could in addition also be provided with an anti-reflective coating.

The anti-reflective coating is produced, for example, in a sol-gel-process or sputtering process. Below are two examples of anti-reflective- or respectively anti-reflection coatings:

Example 1

Single sided anti-reflection coating, produced according to the sol-gel-process:

The coating consists in each case of three individual layers and possesses the following structure: substrate+ M+T+S. The individual layer identified with T contains titanium dioxide $TiO_2$, the individual layer identified with S contains silicon dioxide $SiO_2$ and the individual layer identified with M is drawn in each case from mixed solutions of S– and T. The float glass substrate is carefully cleaned prior to coating. The dip solutions are applied in each case in rooms air-conditioned to approximately 28° C. and at a humidity of 5-10 grams/cubic meter ($g/m^3$). The draw speeds for the individual layers M/T/S are approximately 275/330/288 millimeters per minute (mm/min). Drawing of each gel layer is followed by a baking process in air. The baking-out temperatures and baking-out times are approximately 180° C./20 min. after production of the first gel layer, as well as approximately 440° C./60 min. after production of the second and third gel layer. In the case of the T-layers the dip solution (per liter) consists of: 68 milliliters (ml) titanium-n-butylate, 918 ml ethanol (abs), 5 ml acetyl-acetone and 9 ml ethyl-butyl acetate. The dipping solution to produce the S-layer contains: 125 ml silicic acid methyl ester, 400 ml ethanol (abs), 75 ml $H_2O$ (dest.), 7.5 ml acetic acid and is diluted with 393 ml ethanol (abs) after a rest period of approximately 12 hours. The coating solutions to produce the oxide with the medium refractive index are prepared through mixtures of the S+T—solutions. The layer identified with M is drawn from a dipping solution having a silicone-dioxide content of 5.5 grams/liter (g/l) and a titanium-dioxide content of 2.8 g/l. Through the applied wet-chemical sol-gel-process the dipping method can be utilized in commercial coating of large surfaces, whereby two glass panels are adhered to each other prior to the dipping process, so that the necessary one-side anti-reflective effect is achieved. The adhesive is selected so that it burns at 440° C. within the described baking time, so that the glass panels leave the process separated.

Example 2

Single sided anti-reflection coating, produced according to the sputtering process: The coating is deposited in an inline unit in a mid-frequency (MF) sputtering process through magnetron sputtering, whereby the substrate is positioned on a so-called carrier and is transported on same through the sputtering unit. Inside the coating unit the substrate is first heated to approximately 150° C. for "dewatering" of the surfaces. Then an anti-reflective system (for example consisting of four layers) is produced as follows:

A. Sputtering of a high refractive substrate at a feed rate of 1.7 meters per minute (m/min), whereby the carrier oscillates in front of the sputtering source and while the layer of 30 nanometers (nm) thickness is deposited. The production of the layer occurs through addition of argon and reactive gas, by regulating the reactive gas to plasma impedance. The process pressure is determined, for example, through the amount of argon, which leads to typical process pressures in the range between 1*E-3 and 1*E-2 millibar (mbar). The deposition in the plasma occurs through pulsation.

B. Sputtering of a low refractive layer at a feed rate of approximately 2.14 m/min. A layer having a thickness of approximately 30.5 nm is hereby produced. The layer production occurs according to the deposition described for layer 1.

C. Sputtering of a high refractive layer according to layer 1. Here, a layer having a thickness of approximately 54 nm is produced at a feed rate of approximately 0.9 m/min. according to the description for layer 1.

D. Sputtering of a low-refractive layer according to layer 2. A layer having a thickness of approximately 103 nm is produced at a feed rate of approximately 0.65 m/min. Subsequently the coated substrate is transferred out with the carrier through a transfer chamber.

With the anti-reflective- or respectively anti-reflection coatings described above, a contrast which is defined as $T_{vis}/R_{vis}$ in the range of between approximately 10 to 60, for example between 20 to 60, or between 40 to 50 can be achieved at standard light, whereby the contrast values on glass panels without anti-reflective coating are less than 7. $R_{vis}$ identifies the reflectance of a layer at standard light D65 and $T_{vis}$ the transmittance, namely the reflectance or respectively the transmittance in the visible wavelength range of approximately 350 to 780 nm.

Referring now to FIG. 2, there is shown display unit 1000 with inventive device 101 according to a first aspect of the present invention in the form of a front transparent panel for a display, in this case liquid crystal display 130. As shown in FIGS. 1a-1b, inventive device 101 is provided with first transparent panel element 103 and second transparent panel element 107, as well as with interposed IR-reflective layer 109 and anti-reflection- or respectively anti-reflective coating 120 applied to one outside of the first transparent panel. Liquid crystal display 130 located behind device 101 which may be in the embodiment of a front glass panel includes liquid crystal 133 with lighting device 135 introduced between panels 131.1, 131.2 without being restricted hereto. Entire liquid crystal display 130 is integrated into housing 137. Liquid crystal display 130 is only one possible display. Other possible displays include controllable LED or also OLED. Even though a liquid crystal display is cited, the invention is not restricted to same.

Inventive device 101 in the form of a front glass panel largely prevents sunlight 150 heating up the space between the front glass panel and liquid crystal display 130. In spite of this however it is necessary due to the heat generated by liquid crystal display 130 to actively cool same with cooling device 160. Cooling device 160 can however be dimensioned substantially smaller than in the current state of the art, since there is no heat generation due to solar radiation between the glass panel and the liquid crystal display.

Figure 3B:
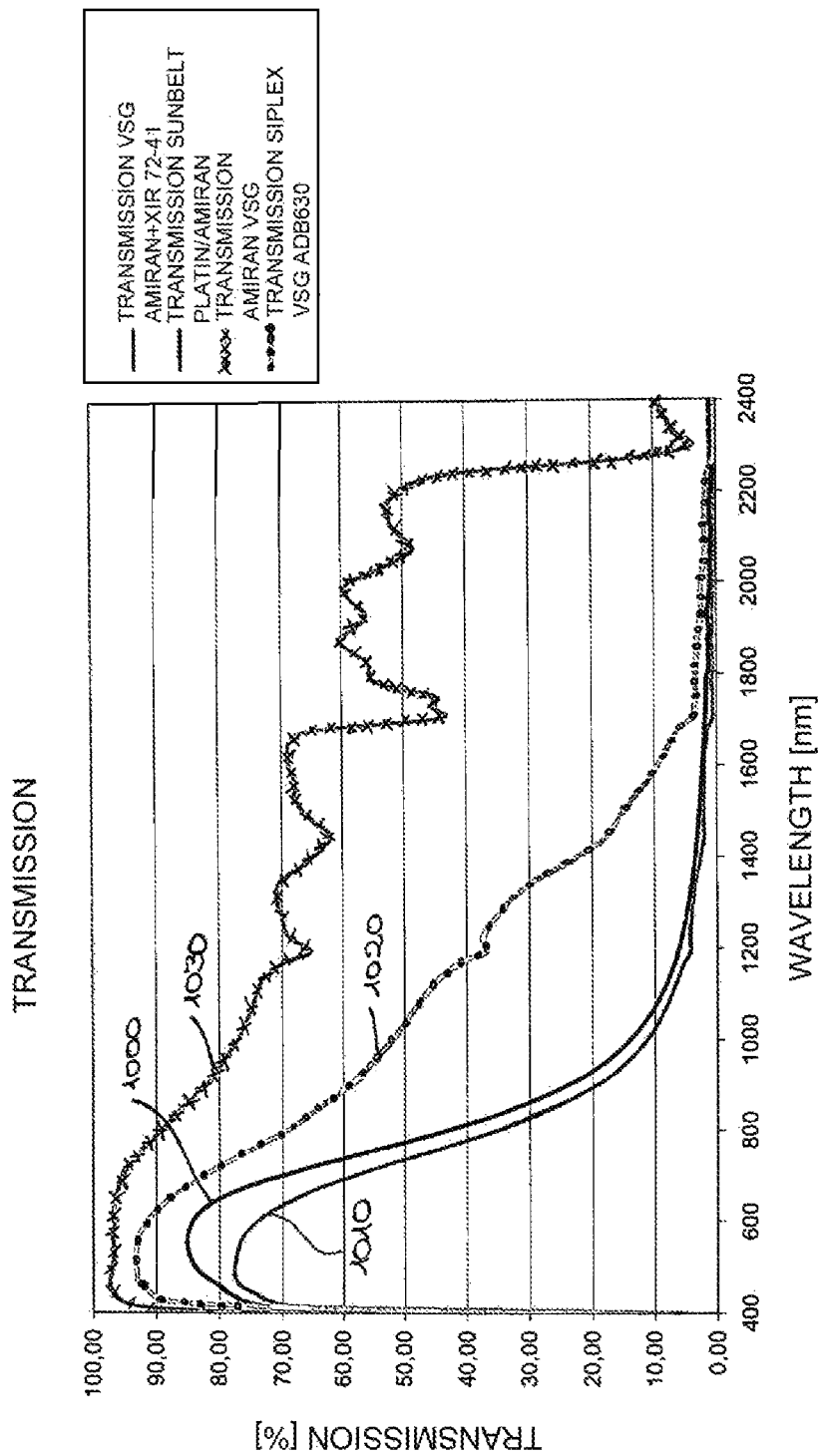

FIG. 3a illustrates the reflectivity for devices with different layer systems over a wavelength of between approximately 400 nm to 2400 nm. Further FIG. 3b illustrates the associated transmission values for the same layer systems, using the same identifications.

Reference number 1000 refers to a system of silver-based coating as an IR-reflection layer by the company ARCON (Feuchtwangen, Bucha), based on the modified layer design "Sunbelt Platin" with an anti-reflective coating; reference number 1010 refers to the reflectivity and absorption of a system with an XIR film by the company Southwall and an anti-reflective coating, as well as reference number 1020 describes a system according to the current state of the art with anti-reflective coating and an IR-reflective film Simplex Solar Control, as well as for comparison an anti-reflection coating with reference number 1030 without IR-reflective coating (CONTURAN by SCHOTT). FIG. 3*a* shows in addition also the curve of ideally reflecting IR-reflective surface 1040 which reflects all wavelengths of more than 780 nm—the limit of the visible light—and the idealized intensity distribution of solar spectrum 1050 which is approximated as Planckian radiator with a surface temperature of 5762K. Here, absorption bands were neglected for simplification in the spectrum. All devices are a lamination system with a first and second transparent panel element and appropriate coating. Data provided in Table 1 for reflection $R_{vis}$ and transmission $T_{vis}$ in the visible wavelength range, as well as IR-transmission T (IR) and IR-solar reflectivity relate to the overall systems, in other words to the laminated glass element consisting of two glass panel elements with the appropriate coatings. We refer you to FIG. 1*b* in this context.

Table 1 provides data for the different layer systems which were discussed in FIGS. 3*a* and 3*b*.

|  | System (glass panel 1/IR layer/panel 2) | | | |
| --- | --- | --- | --- | --- |
|  | $R_{vis}$ (D65) | $T_{vis}$ (D65) | T (IR) 780-2000 nm | IR Solar reflection |
| CONTURAN Anti-reflective coating | 1% | 96% | 67% | 17% |
| IR-reflective film Siplex Solar + anti-reflective coating | 1.5% | 92% | 28% | 11% |
| XIR film + anti-reflective coating | 1.5% | 77% | 8% | 40% |
| Silver-based IR-reflection/ anti-reflective coating | 1.4% | 84% | 9% | 68% |

As demonstrated in Table 1, the highest contrast, namely of $T_{vis}/R_{vis}=60$, with the highest transmission $T_{vis}$, namely of 84% occurs at the highest IR-solar reflection of 68% and low IR-transmission T (IR) of only 9% for the inventive device consisting of two glass or transparent panels with a silver-based IR-reflection system arranged between them in combination with an anti-reflective coating on the first and/or the second glass panels of the laminated system.

As demonstrated in Table 1, also the laminated glass panel with XIT film has a low transmission; however the IR-reflectivity is only 40% and not 68% as in the case of the metal- or respectively silver-based IR-reflection layer. A high portion of IR-radiation of the natural sunlight or respectively solar spectrum is absorbed by or respectively introduced into the XIR film, due to which a system of this type, compared to a system with a metal-based IR-reflective layer heats up to an unacceptable level.

With the assistance of an approximated solar spectrum which can be effectively illustrated by a Planckian radiator with T=5762K one can derive how much energy of the sunlight emigrates into the range above 780 nm to 2500 nm: approximately 45% of the solar energy is in this range and approximately 55% in the range 350 nm-780 nm. UV-portions of below 350 nm were hereby neglected, since the transmission is here already substantially reduced by the solid or respectively liquid filler material. Wavelengths above 2500 nm also were not considered, since glass above 2500 nm itself is strongly absorbent.

In addition to approximated solar spectrum 1050, FIG. 3*b* also illustrates ideal IR-reflector 1040, which does not show any reflection in the visible range of below 780 nm, and which does show 100% reflectivity above 780 nm. This ideal design of the reflector allows a reflection of approximately 45% of the relevant solar radiation without impairment of the visible range. The numerical values of the IR-reflection are stated relative to this ideal IR-reflector in this application.

As to how the spectral reflectivity's of the examples in FIG. 3*a* are folded with the relative intensity of the approximated solar spectrum which is approximated as Planckian radiator with T=5762K, one can determine how much solar radiation is reflected in the IR-range above 780 nm. This value, relative to the reflectivity of the idealized if-reflector with 100% above 780 nm is defined in this application as IR-solar reflectivity.

Table 1 demonstrates that 30% of the energy of the entire solar spectrum can be reflected using a silver-based IR-reflection layer. This is consistent with an IR-solar reflectivity of 68% compared with the ideal reflector with curve 1040, whereas only 18% is possible with an XIR film which is consistent with an IR-solar reflectivity of 40% compared to the ideal reflector.

It is clear to an expert that in practical embodiments portions of the visible spectrum of curves 1000, 1100, 1040 and 1050 can still be used for IR-reflection, since the eye is increasingly sensitive toward the edges of the visible range. To prove the effectiveness, the simplification was provided using an ideal reflector.

Due to the inventive system of a laminated panel with IR-reflective coating as described above it is possible for the first time to combine a high optical contrast in the visible wavelength range, in particular in outdoor use in the display field with a high IR-reflectivity and to thereby reduce the heat admission due to near IR-solar radiation. An additional advantage is the ease of fabrication since standard coating processes for silver-based low-E-coatings can be utilized to produce the IR-coating.

FIGS. 4*a*-4*d*, as well as 5*a*-5*d* show the cross section through an inventive device with polarizing filter according to a second aspect of the present invention. More specifically, in FIG. 4*a*, 2001 identifies the first transparent panel element. Polarizing filter 2005 was combined directly with the first transparent panel element using adhesion layer 2003.

Figure 4A:
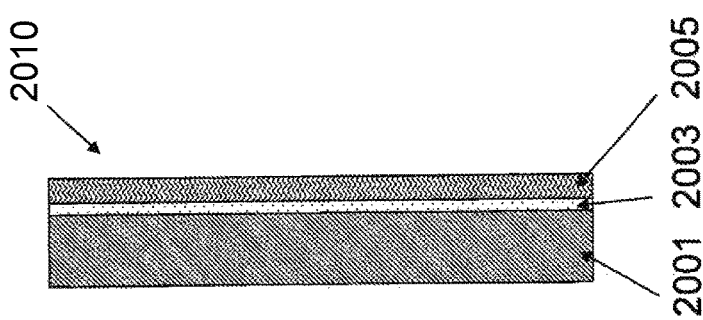
FIGS. 4a-4d illustrate the inventive device with integrated polarizing filter according to a second aspect of the present invention.
Figure 4B:
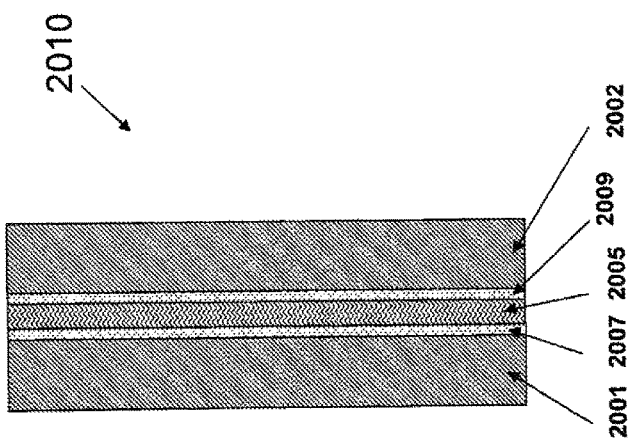

FIG. 4*b* shows an expanded solution variation whereby polarizing filter 2005 was introduced between transparent panel elements 2001 and 2002 using two filler materials 2007 and 2009. Polarizing filter 2005, together with panel elements 2001 and 2002 form a lamination or respectively a laminated transparent panel. In order to form the lamination, solid or liquid filler material 2007 and 2009, for example a polymer material or a solidified inorganic substance is introduced into the space between panels 2001 and 2002. In contrast to an insulating glass lamination where two glass panels are arranged separated from each other by a space with a gaseous medium, in the inventive device panel elements 2001 and 2002 fit closely against each other through filler material 2007 and 2009 and polarizing filter 2005, resulting in the laminate element.

Figure 4C:
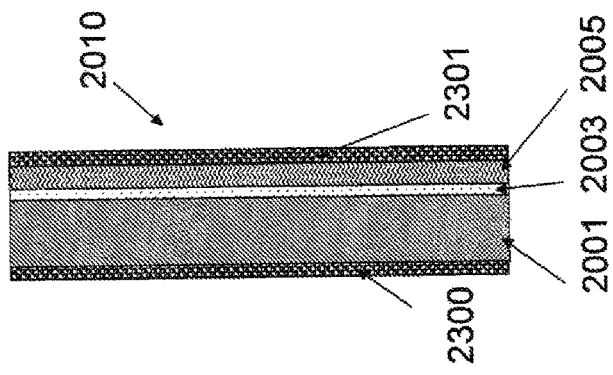
Figure 4D:
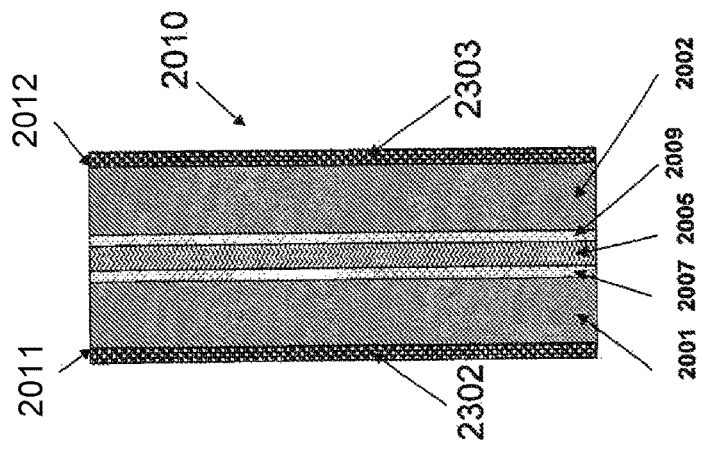

In order to achieve a high transmission $T_{vis}$ from the display unit through device 2010 to the viewer and in order to achieve a low reflection $R_{vis}$ of the incident light coming into device 2010 from one or both sides, which is for example $R_{vis}<2\%$, or <1%, oxidic and/or conductible oxidic adaptation layers which minimize the reflectivity $R_{vis}$ inside the device or respectively laminated element 2010 can be provided as illustrated in FIGS. 4*c* and 4*d*.

Figure 5A:
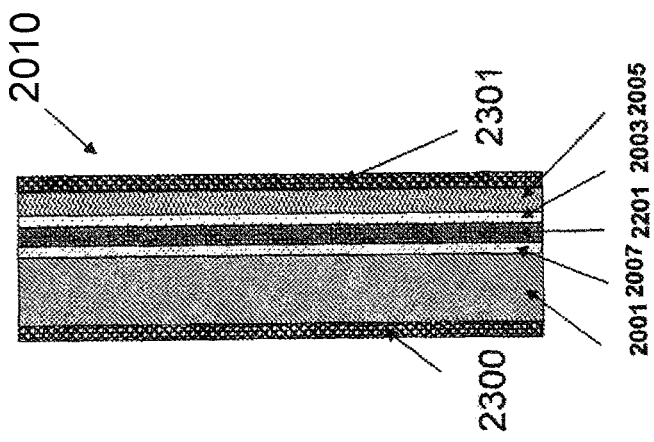
FIGS. 5a-5b illustrate the inventive device with integrated polarizing filter and additional IR-protective device.
Figure 5B:
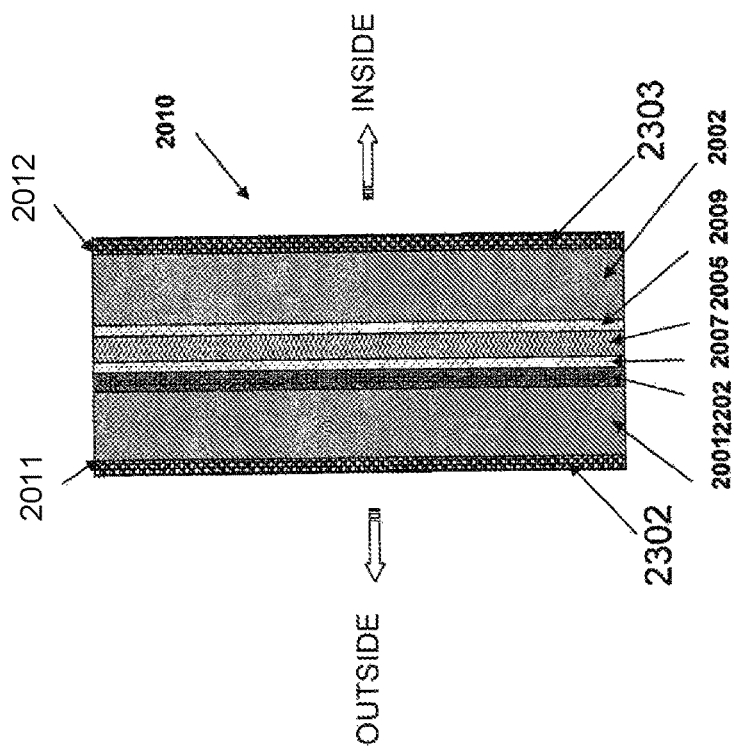

Referring now to FIGS. 5a and 5b, there is shown the combination of the polarized filter shown in FIG. 4 with additional IR reflective coatings, as shown for example in FIGS. 1a to 1b which can be included in the device. FIG. 5a shows an example of layer 2201 which can represent for example a solar protective film, as well as in FIG. 5b layer 2202, which may for example be realized by a low-E-layer. By introducing a low-E-layer into the system the same conditions apply as presented in the prior description for example in regard to FIG. 1a through 3.

The configuration of an IR-reflective coating, such as a low-E-coating on the basis of silver coatings is described in detail in "Hans-Joachim Gläser, Dünnfilmtechnologie auf Flachglas", page 167-171". The disclosure content of this documentation is incorporated in its entirety into the current application. Whereas also other metals, such as gold or aluminum are possible as IR-reflective coatings, silver is has a good color effect.

When using the inventive device in particular outdoors for display units, in order to increase the contrast in the event of direct solar irradiation, the exterior surface, that is side 2011 of the device facing the atmosphere is provided with anti-reflective coating or respectively an anti-reflection coating 2300, 2302. Of course, interior surface, that is side 2012, of the device facing the display unit can be provided with anti-reflective coating or respectively anti-reflection coating 2301, 2303. Each of the interface surfaces between panel material 2001, 2002 or respectively polarizing filter 2005 and ambient air or respectively air/gas filling of space 2102 should be provided with an anti-reflection coating for an optimum effect.

Anti-reflective coatings or anti-reflection coatings to be considered are for example anti-reflective coatings produced by sol-gel process according to the previously described examples 1 and 2.

With the anti-reflective- or respectively anti-reflection coatings as described in examples 1 and 2, a contrast which is defined as $T_{vis}/R_{vis}$ can be reached in a range of between approximately 10 to 60, for example between 20 to 60, or between 40 to 50 at standard light, whereby the contrast values on glass panels without anti-reflective coating are less than 7. $R_{vis}$ identifies the reflectance of a layer at standard light D65 and $T_{vis}$ the transmittance that is the reflectance or respectively the transmittance in the visible wavelength range of 350 to 780 nm.

Figure 6:
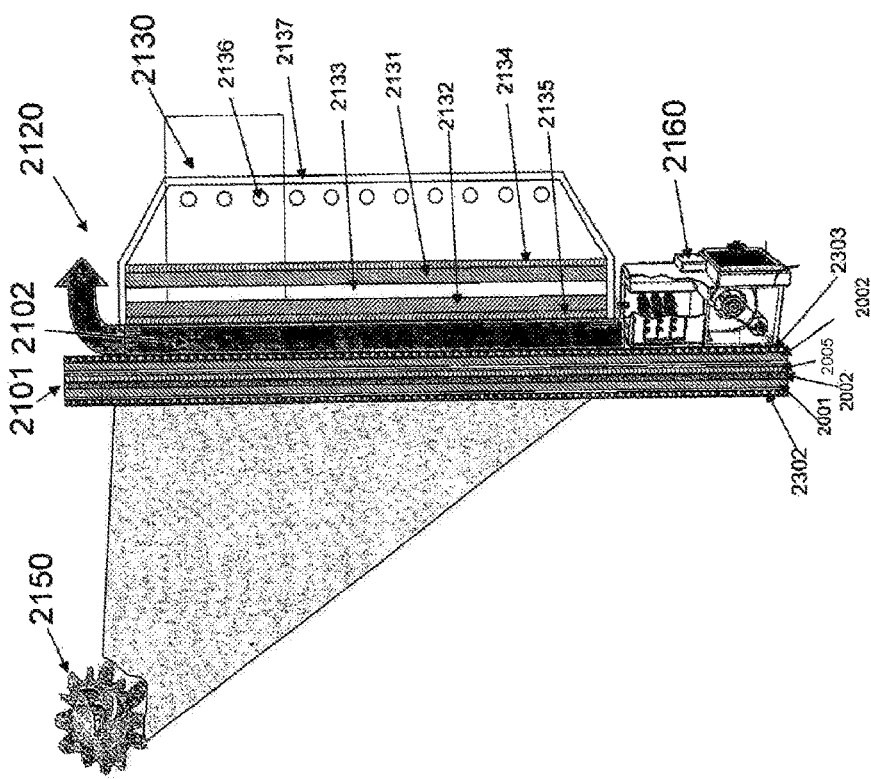
FIG. 6 illustrates LC-display unit for application with direct solar radiation, with an inventive device according to one of the FIGS. 4a-4d or 5a-5b.

Referring now to FIG. 6, there is shown display unit 2120 with an inventive device in the embodiment of a front transparent panel 2101 for a display—in this instance liquid crystal display 2130. As shown in FIG. 5b and here used as an example, the inventive device is provided with first transparent or glass panel element 2001 and second transparent or glass panel element 2002 as well as with polarized filter 2005 interposed between them and IR-reflective layer 2002 between them and one anti-reflection- or respectively anti-reflective coating 2302 applied to the outside of the first panel, and anti-reflection- or respectively anti-reflective coating 2303 applied to the outside of the second panel. Liquid crystal display 2130 located behind the device which is in the embodiment of front glass panel 101 includes liquid crystal 2133 as lighting device 2136 introduced between panels 2131, 2132 without being restricted hereto. Towards lighting device 2136, rear polarizer 2134 is located on the backside of panel 2131, and front polarizer 2135 of liquid crystal display 2130 is located on the front side of panel 2132. Alternatively, front polarizer 2135 can also be omitted, whereby its function in this arrangement is then assumed by polarizing filter 2005 of front panel 2101. Entire liquid crystal display 2130 is integrated into housing 2137. Liquid crystal display 2130 is only one possible display. Other possible displays include controllable LED or also OLED. Even though a liquid crystal display is cited, the invention is not restricted to same.

Inventive device in the form of front panel 2101 largely prevents sunlight 2150 heating up space 2102 between the front panel and liquid crystal display 2130. In spite of this however it is necessary due to the heat generated by liquid crystal display 130 to actively cool same with cooling device 2160. Cooling device 2160 can however be dimensioned substantially smaller than in the current state of the art, since there is no heat generation due to solar radiation between the glass panel and the liquid crystal display.

Figure 7:
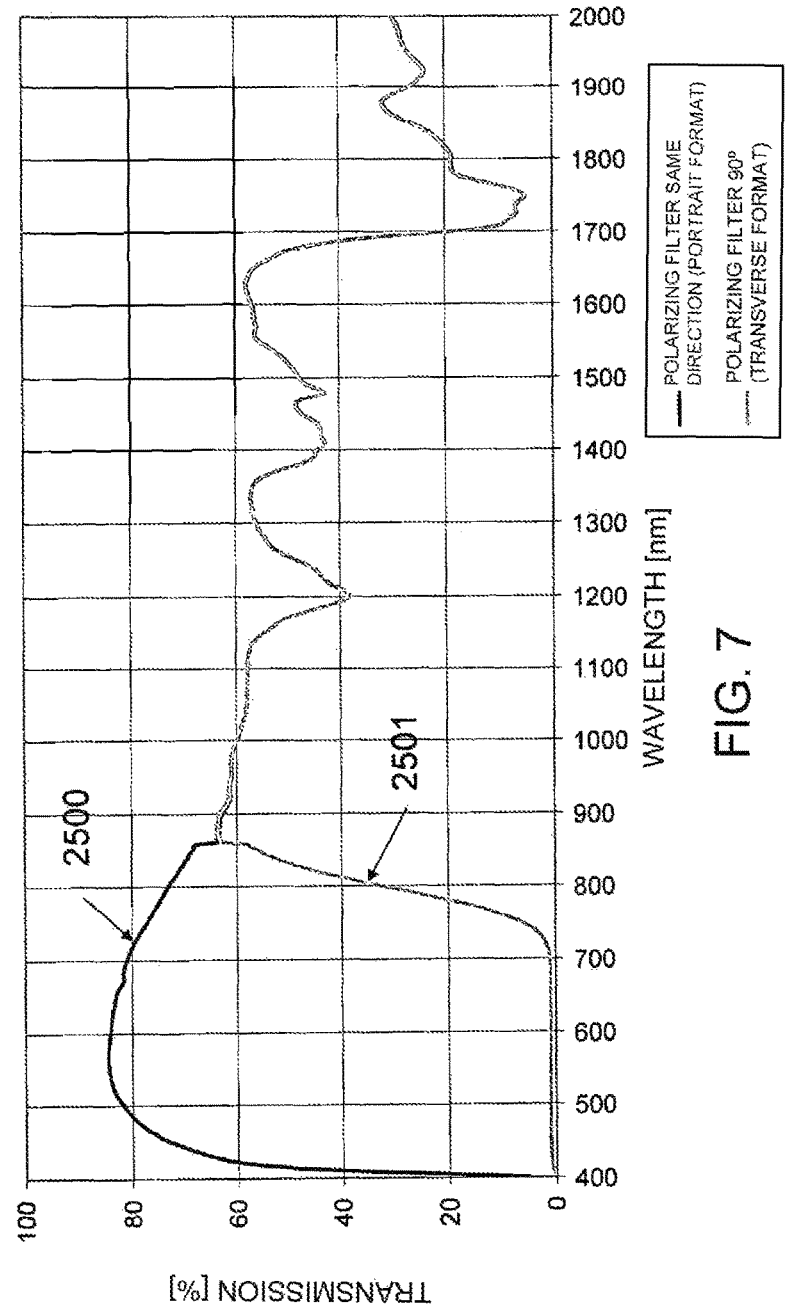
FIG. 7 illustrates the transmission curves of an inventive polarizing filter limited between two 4 mm float glasses, in parallel orientation (same) of the polarizing filter with the analyzer and perpendicular thereto, depending upon the wavelength.

Referring now to FIG. 7, there is shown the transmission for devices with introduced polarizer and different layer systems over a wavelength of 400 nm to 2000 nm. Curve 2500 illustrates the transmission for device 2010 from a polarizer which was laminated using polyurethane film between two glass panel-like transparent elements having a thickness of 4 mm, analogous to the arrangement in FIG. 1b. The transmission in this curve is in the range of between approximately 430 nm to greater than 750 nm above 60% transmission. Curve 2501 illustrates the same arrangement as curve 2500, whereby the example is turned by 90°. Here, the transmission is in the range between 430 nm to 750 nm below 10%, in broad segments even below 1% transmission.

Figure 8:
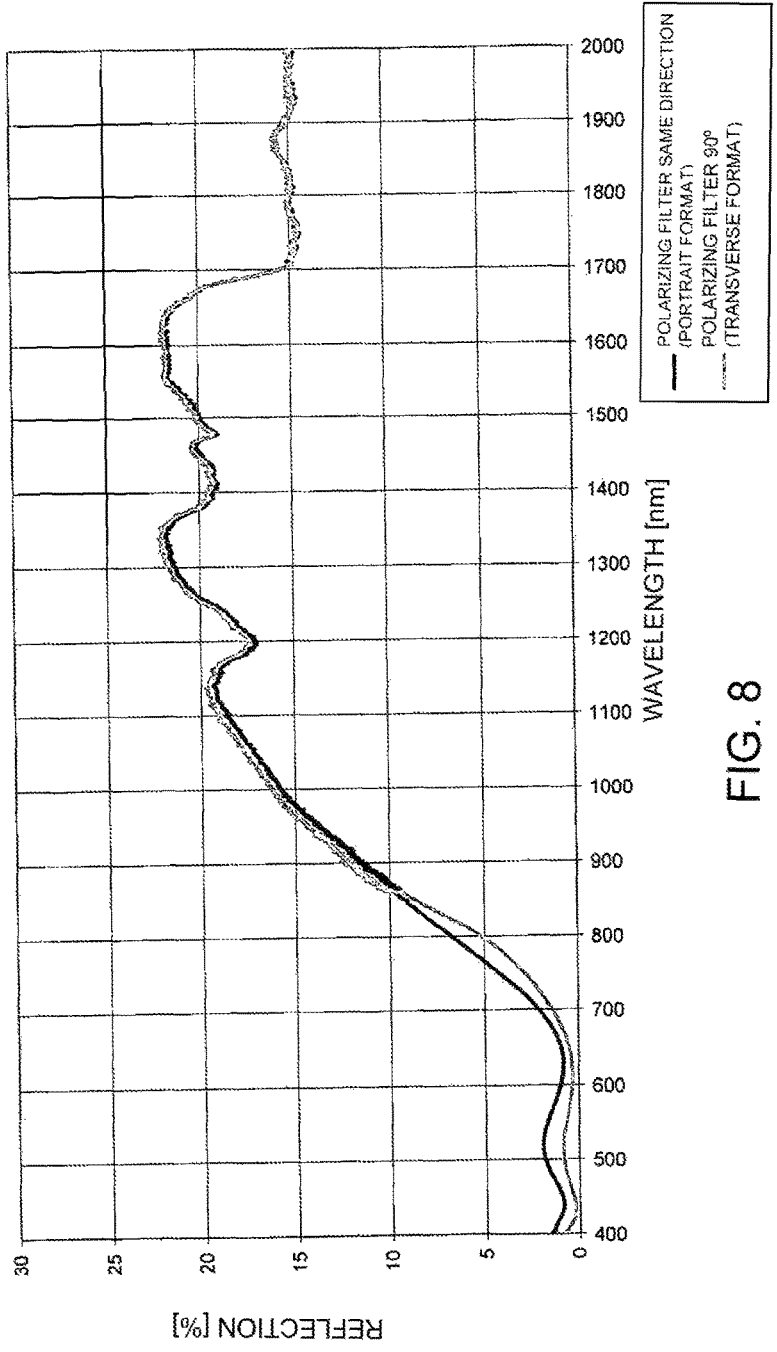
FIG. 8 illustrates the reflection curve of an inventive polarizing filter, laminated between two 4 mm float glasses which are anti-reflection coated on one side, in parallel (same) orientation of the polarizing filter with the analyzer and perpendicular thereto, depending upon the wavelength.

Referring now to FIG. 8, there is shown the reflection for devices with introduced polarizer and different layer systems over a wavelength of 400 nm to 2000 nm. Due to applied anti-reflection layers 2302, 2303 according to an arrangement in FIG. 4d on the outside of the laminate, the total reflection of device 2010 compared to reflection when using an uncoated float glass with approximately 8% visible range of light between 380 nm and 780 nm is substantially reduced.

TABLE 2

Reflection and transmission of CONTURAN with polarizing filter according to FIG. 4d and in comparison CONTURAN without polarizing filter.

| System | $R_{vis}$ (D65) Measured with non-polarized radiation | $T_{vis}$ (D65) Measured with radiation parallel to polarization direction of the polarizing filter | $T_{vis}$ (D65) Measured with radiation perpendicular to polarization direction of the polarizing filter | $T_{vis}$ (D65) Measured with non-polarized radiation | Relationship $T_{vis}$ (D65, non-polarized) to $T_{vis}$ (D65 parallel) |
|---|---|---|---|---|---|
| CONTURAN anti-reflective coating (2302, | 1% | 96% | 96% | 96% | 1.0 |

TABLE 2-continued

Reflection and transmission of CONTURAN with polarizing filter according to FIG. 4d and in comparison CONTURAN without polarizing filter.

| System | $R_{vis}$ (D65) Measured with non-polarized radiation | $T_{vis}$ (D65) Measured with radiation parallel to polarization direction of the polarizing filter | $T_{vis}$ (D65) Measured with radiation perpendicular to polarization direction of the polarizing filter | $T_{vis}$ (D65) Measured with non-polarized radiation | Relationship $T_{vis}$ (D65, non-polarized) to $T_{vis}$ (D65 parallel) |
|---|---|---|---|---|---|
| 2303) as in FIG. 4d without polarizing filter 5 CONTURAN anti-reflective coating (2302, 2303) with laminated polarizing filter 5 (FIG. 4d) | 0.9% | 83.6% | 1.1% | 44% | 0.53 |

Table 2 provides the data for the reflection and transmission of CONTURAN produced by Schott AG with polarizing filter according to FIG. 4d and for comparison CONTURAN, without polarizing filter. One can see that in the arrangement without polarizing filter the sunlight (non-polarized) penetrates to 96% through the glass and heats up the LC-display located behind it. (This observation applies to the portion of solar radiation which is visible, in other words 380 nm to 780 nm). At the same time, the light emitted from the LC-display can also penetrate through the glass to the same percentage, reaching the viewer. As soon as a polarizing filter is employed, only 44% of the non-polarized visible sunlight is transmitted, whereas the radiation of the LC-display which, per definition is oriented along the parallel polarization direction passes through device 10 at 83.6%. The transmission of the radiation from the LC-display to the viewer is only slightly dampened. The relationship $T_{vis}$ (D65, non-polarized) to $T_{vis}$ (D65 parallel) provides that with this solution effectively only 53% of the visible radiation of the sunlight reaches the display. The display is therefore heated substantially less.

At the same time, due to the low reflection Rvis of device 2010 of only 0.9% according to Table 1 it can be achieved that disruptive reflexes of sunlight are suppressed when viewing the image on the LCD-monitor. The arrangement achieves hereby improved values compared to the standard arrangement of display units with anti-reflective glasses.

Due to the inventive device with a polarizer and, if required, with an IR-reflective film it is possible for the first time to achieve a high optical contrast, in other words the relationship of the desired radiation from the display unit relative to the disruptive reflection of sunlight in the visible wavelength range, in particular in outdoor use without appreciably reducing the brightness of the display unit and at the same time to reduce the heat being introduced in particular through solar radiation in the visible wavelength range. An additional advantage is the ease of fabrication since standard processes and films can be utilized to realize the described invention.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A device in particular for a display unit, the device comprising:
    a first transparent panel element having an exposed exterior surface;
    a second transparent panel element having an exposed exterior surface and an inner surface;
    a filler material between said first transparent panel element and said second transparent panel element, said filler material consisting of at least one polymer material or at least one solidified inorganic substance;
    an infrared (IR) reflective coating applied to said filler material, said coated filler material contacting both said first transparent panel element and said second transparent panel element, and wherein said first transparent panel element, said second transparent panel element and said coated filler material form a composite;
    the device further including adaptation layers arranged between said first transparent panel element and said IR-reflective coating and between said IR-reflective coating and said second transparent panel element such that said IR-reflective coating is adapted to said filler material and to the inner surface of the second transparent panel element to reduce a reflectivity in a visible wavelength range within said composite, and said adaptation layers form symmetric layer formations on both sides of said IR-reflective coating; and
    said filler material formed so as to cover at least one of the side of said first transparent panel element of said adaptation layers and the side of incoming sunlight, and a respective edge of said IR-reflective coating and said adaptation layers, wherein at least one of said first transparent panel element and said second transparent panel element is formed from one of glass and a polymer material, and the device has a visible wavelength range reflectivity of <2% resulting from said adaptation layers.

2. The device according to claim 1, wherein at least one of said first transparent panel element and said second transparent panel element is discoidal in shape.

3. The device according to claim 1, wherein an infrared (IR)-solar reflectivity of the device is in a range between approximately 45% and 90%.

4. The device according to claim 3, wherein said IR-solar reflectivity of the device is in a range between 50% and 80%.

5. The device according to claim 4, wherein an edge of at least one of said first transparent panel element and said second transparent panel element has one of an absence of said IR-reflective coating and an interrupted IR-coating along said edge.

6. The device according to claim 5, wherein said edge of at least one of said first transparent panel element and said second transparent panel element includes a sealing material.

7. The device according to claim 1, wherein said IR-reflective coating is one of:
a low-E-coating;
a low-E-coating including a metallic highly conductive layer; and
a low-E-coating including at least one of silver, gold and aluminum.

8. The device according to claim 7, wherein at least one of said first transparent panel element and said second transparent panel element includes an anti-reflective coating arranged on at least one of an outer surface of said first transparent panel element and an outer surface of said second transparent panel element.

9. The device according to claim 8, wherein said anti-reflective coating is in a visible wavelength range.

10. The device according to claim 1, wherein said adaptation layers result in a visible wavelength range reflectivity of the device of <1%.

11. The device according to claim 10, wherein said adaptation layers are at least one of oxidic layers and conductive oxidic layers.

12. The device according to claim 8, wherein said anti-reflective coating is applied using one of a liquid technology, a high-vacuum technology, a chemical vapor deposition (CVD) process and an etching process.

13. The device according to claim 12, wherein said liquid technology is a sol-gel technology.

14. The device according to claim 13, wherein said anti-reflective coating is one of a single-layer interference coating and a multi-layer interference coating.

15. The device according to claim 14, wherein said multi-layer interference coating is a three-layer interference coating in said sol-gel technology, said three layer interference coating including a first layer having a refractive index between approximately 1.6 and 1.8, a second layer having a refractive index between approximately 1.9 and 2.5 and a third layer having a refractive index between 1.4 and 1.55.

16. The device according to claim 12, wherein said anti-reflective coating is applied using said high-vacuum technology and is one of:
a single layer system;
a sputtering process under a high vacuum; and
a high-vacuum coating process by thermal evaporation.

17. The device according to claim 12, wherein said anti-reflective coating is applied using said CVD process and said CVD process is one of an online-CVD process and an offline-CVD process.

18. The device according to claim 12, wherein said anti-reflective coating is applied using said etching process, said anti-reflective coating being one of a porous layer and a light-scattering surface.

19. The device according to claim 1, further comprising a polarizing filter laminated with said first transparent panel element, said polarizing filter having a polarization direction oriented parallel to a polarization direction of a light emitted by the display unit, wherein the display unit is positioned behind said laminated first transparent panel element and said polarizing film and the device is positioned to provide a predefined space between the device and the display unit.

20. The device according to claim 1, wherein the device is configured for use in the field of one of display units and picture glazing.

21. The device according to claim 20, wherein the device is configured for use in outdoor display units.

22. The device according to claim 21, wherein the device is configured for liquid crystal display units.

23. A display unit, comprising:
a liquid crystal display unit; and
one front transparent panel, said front transparent panel comprising;
a first transparent panel element having an exposed exterior surface;
a second transparent panel element having an exposed exterior surface and an inner surface;
a filler material between said first transparent panel element and said second transparent panel element, said filler material consisting of at least one polymer material or at least one solidified inorganic substance;
an infrared (IR) reflective coating applied to said filler material, said coated filler material contacting both said first transparent panel element and said second transparent panel element, and wherein said first transparent panel element, said second transparent panel element and said coated filler material form a composite;
said front transparent panel further including adaptation layers arranged between said first transparent panel element and said IR-reflective coating and between said IR-reflective coating and said second transparent panel element such that said IR-reflective coating is adapted to said filler material and to the inner surface of the second transparent panel element to reduce a reflectivity in a visible wavelength range within said composite, and said adaptation layers form symmetric layer formations on both sides of said IR-reflective coating; and
said filler material formed so as to cover at least one of the side of said first transparent panel element of said adaptation layers and the side of incoming sunlight, and a respective edge of said IR-reflective coating and said adaptation layers, wherein at least one of said first transparent panel element and said second transparent panel element is formed from one of glass and a polymer material, and the front transparent panel has a visible wavelength range reflectivity of <2% resulting from said adaptation layers.

24. The display unit according to claim 23, wherein at least one of said first transparent panel element and said second transparent panel element is discoidal in shape.

25. The display unit according to claim 23, wherein an infrared (IR)-solar reflectivity of the front transparent panel is in a range between approximately 45% and 90%.

26. The display unit according to claim 23, wherein said IR-solar reflectivity of the front transparent panel is in a range between 50% and 80%.

27. The display unit according to claim 26, wherein an edge of at least one of said first transparent panel element and said second transparent panel element has one of an absence of said IR-reflective coating and an interrupted IR-coating along said edge.

28. The display unit according to claim 27, wherein said edge of at least one of said first transparent panel element and said second transparent panel element includes a sealing material.

29. The display unit according to claim 23, wherein said IR-reflective coating is one of:
a low-E-coating;
a low-E-coating including a metallic highly conductive layer; and
a low-E-coating including at least one of silver, gold and aluminum.

30. The display unit according to claim 29, wherein at least one of said first transparent panel element and said second transparent panel element includes an anti-reflective coating arranged on at least one of an outer surface of said first transparent panel element and an outer surface of said second transparent panel element.

31. The display unit according to claim 30, wherein said anti-reflective coating is in a visible wavelength range.

32. The display unit according to claim 23, wherein said adaptation layers result in a visible wavelength range reflectivity of the front transparent panel of <1%.

33. The display unit according to claim 32, wherein said adaptation layers are at least one of oxidic layers and conductive oxidic layers.

34. The display unit according to claim 33, wherein said anti-reflective coating is applied using one of a liquid technology, a high-vacuum technology, a chemical vapor deposition (CVD) process and an etching process.

35. The display unit according to claim 34, wherein said liquid technology is a sol-gel technology.

36. The display unit according to claim 35, wherein said anti-reflective coating is one of a single-layer interference coating and a multi-layer interference coating.

37. The display unit according to claim 36, wherein said multi-layer interference coating is a three-layer interference coating in said sol-gel technology, said three layer interference coating including a first layer having a refractive index between approximately 1.6 and 1.8, a second layer having a refractive index between approximately 1.9 and 2.5 and a third layer having a refractive index between 1.4 and 1.55.

38. The display unit according to claim 34, wherein said anti-reflective coating is applied using said high-vacuum technology and is one of:
a single layer system;
a sputtering process under a high vacuum; and
a high-vacuum coating process by thermal evaporation.

39. The display unit according to claim 34, wherein said anti-reflective coating is applied using said CVD process and said CVD process is one of an online-CVD process and an offline-CVD process.

40. The display unit according to claim 34, wherein said anti-reflective coating is applied using said etching process, said anti-reflective coating being one of a porous layer and a light-scattering surface.

41. The display unit according to claim 23, further comprising a polarizing filter laminated with said first transparent panel element, said polarizing filter having a polarization direction oriented parallel to a polarization direction of a light emitted by the display unit, wherein the display unit is positioned behind said laminated first transparent panel element and said polarizing film and the front transparent panel is positioned to provide a predefined space between the front transparent panel and the display unit.

42. A device in particular for a display unit, the device comprising:
a first transparent panel element having an exposed exterior surface;
a second transparent panel element having an exposed exterior surface and an inner surface;
an anti-reflective coating applied onto said exposed exterior surface of the first transparent panel element and configured for increasing the contrast of the device;
a filler material between said first transparent panel element and said second transparent panel element, said filler material consisting of at least one polymer material or at least one solidified inorganic substance;
an infrared (IR) reflective coating applied to said filler material, said coated filler material contacting both said first transparent panel element and said second transparent panel element, and wherein said first transparent panel element, said second transparent panel element and said coated filler material form a composite; and
a first adaptation layer arranged between said first transparent panel element and said IR-reflective coating and a second adaptation layer arranged between said IR-reflective coating and said second transparent panel element, said second adaptation layer contacting said second transparent panel element and adapting said IR-reflective coating to the inner surface of the second transparent panel element, and said first adaptation layer contacting said filler material and adapting said IR-reflective coating to said filler material in order to reduce a reflectivity in a visible wavelength range within said composite, and said first and second adaptation layers form symmetric layer formations on both sides of said IR-reflective coating, wherein at least one of said first transparent panel element and said second transparent panel element is formed from one of glass and a polymer material, and the device has a visible wavelength range reflectivity of <2% resulting from said adaptation layers such that said composite has a high optical contrast in the visible wavelength range and a high IR-reflectivity to reduce a heat admission due to a near IR-solar radiation.

* * * * *

UNITED STATES PATENT AND TRADEMARK OFFICE
CERTIFICATE OF CORRECTION

PATENT NO. : 10,384,422 B2
APPLICATION NO. : 13/455809
DATED : August 20, 2019
INVENTOR(S) : Walther et al.

Page 1 of 1

It is certified that error appears in the above-identified patent and that said Letters Patent is hereby corrected as shown below:

On the Title Page

After "Continuation of application PCT/EP2010/006236, filed on October 12, 2010.", Item (30), please insert the following:
--Foreign Application Priority Data
Mar. 17, 2010 (DE) 20 2010 003 683.6
Oct. 28, 2009 (DE) 10 2009 051 116.4--.

In the Specification

Column 16
At Line 13, please delete "if-reflector", and substitute therefore --IT-reflector--.

Signed and Sealed this
Thirteenth Day of October, 2020

Andrei Iancu
*Director of the United States Patent and Trademark Office*